United States Patent [19]
Macy

[11] Patent Number: 5,408,876
[45] Date of Patent: Apr. 25, 1995

[54] SINGLE ENDED TUNING FORK INTERNAL SENSOR AND METHOD

[75] Inventor: David F. Macy, Mission Viejo, Calif.

[73] Assignee: New SD, Inc., San Francisco, Calif.

[21] Appl. No.: 152,822

[22] Filed: Nov. 15, 1993

Related U.S. Application Data

[62] Division of Ser. No. 667,828, Mar. 12, 1991, abandoned.

[51] Int. Cl.[6] .............................................. G01P 9/04
[52] U.S. Cl. ...................................... 73/505; 73/1 D; 310/370
[58] Field of Search ..................... 73/1 D, 1 DV, 505; 310/329, 370; 29/25.35, 595

[56] References Cited

U.S. PATENT DOCUMENTS

| | | | |
|---|---|---|---|
| 3,683,213 | 8/1972 | Staudte | 310/370 |
| 4,379,244 | 4/1983 | Dinger | 310/370 |
| 4,674,331 | 6/1987 | Watson | 73/505 |

*Primary Examiner*—John E. Chapman

*Attorney, Agent, or Firm*—Flehr, Hochbach, Test, Albritton & Herbert

[57] ABSTRACT

Single ended tuning fork inertial sensor having a housing and a single ended tuning fork of a quartz-like material of a predetermined thickness, the tuning fork has first and second tines lying in a plane and having an axis of symmetry and has a body formed integral with said first and second tines. The body is rigidly secured to the housing. The tines have a rectangular cross section and have a width which is different from the thickness. The body has a stem formed therein which has a width less than that of the body. Drive electrodes are secured to the tines. An oscillatory frequency is supplied to the above drive electrodes to excite the tines in a drive mode and in the presence of an axial angular rate to cause the tines to operate in a pickup mode which is substantially separated in frequency from the drive mode. The width and thickness of the tines are chosen so as to provide a frequency difference between the frequency of the pickup mode and the frequency of the drive mode, and width and length of the stem are chosen so as to a reduce the frequency difference.

3 Claims, 3 Drawing Sheets

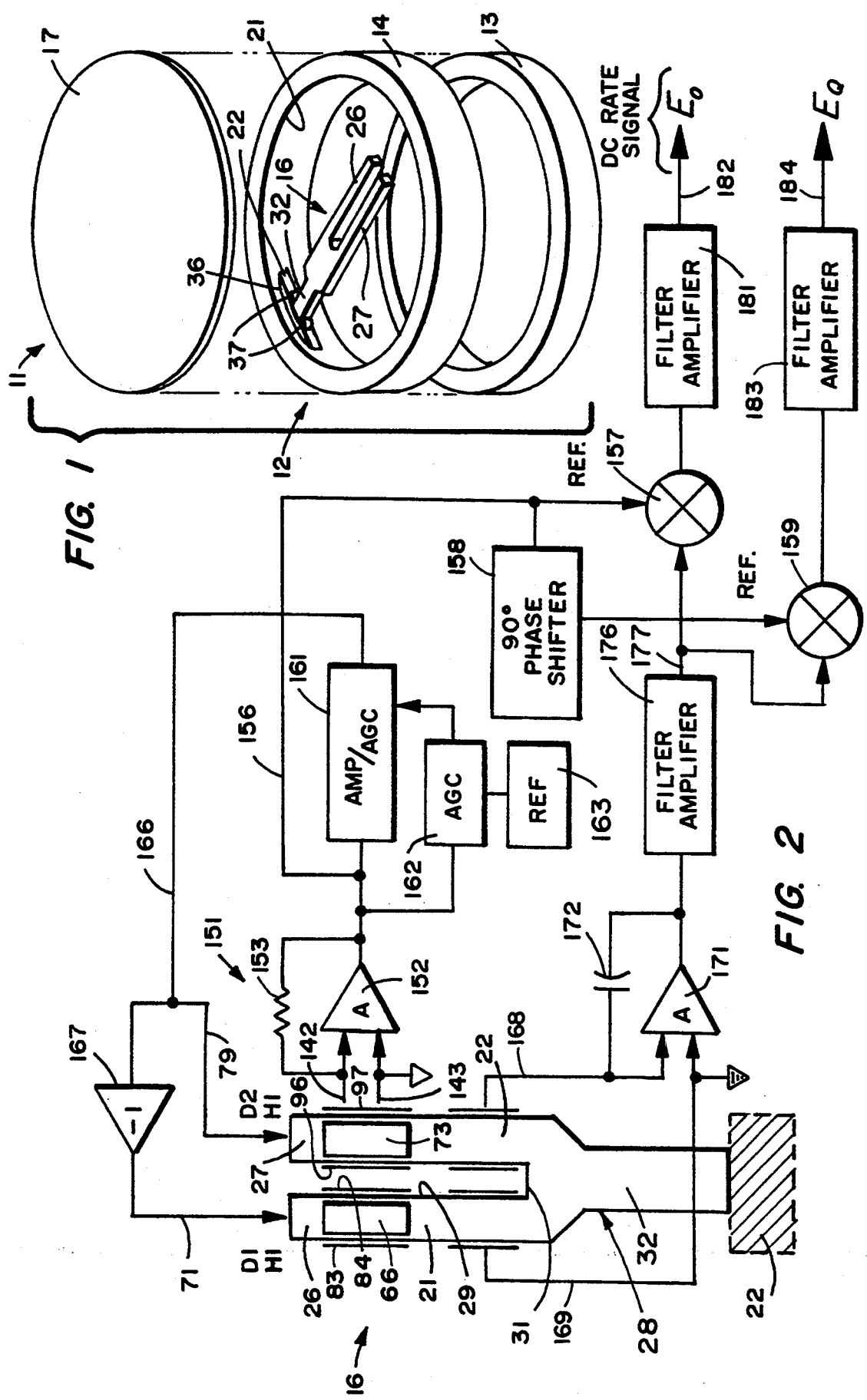

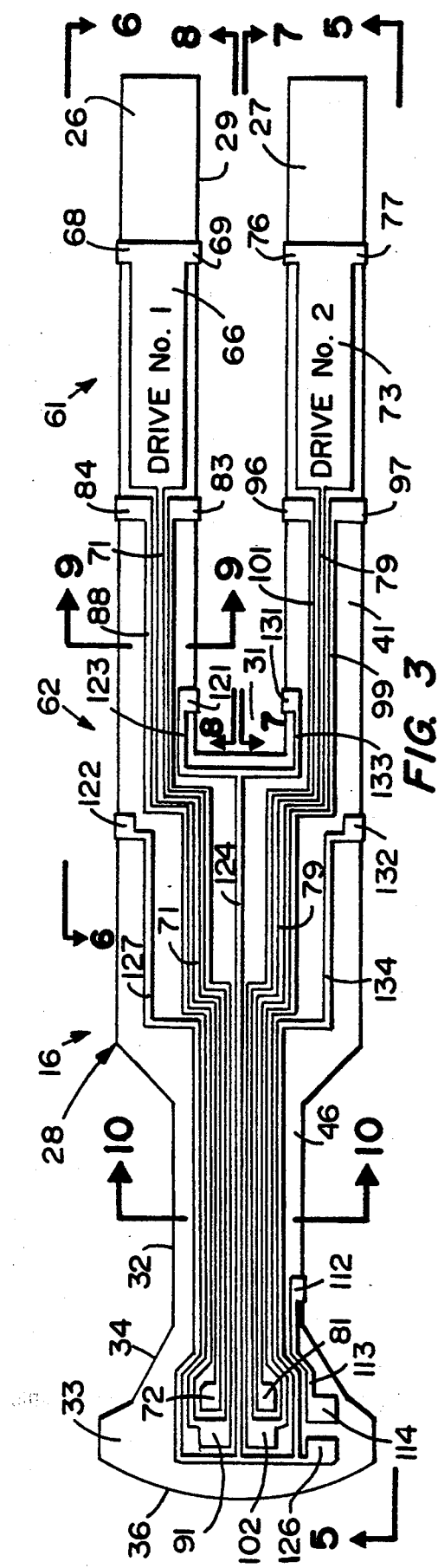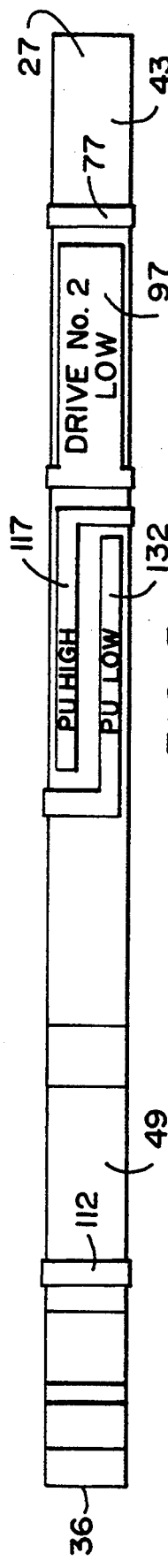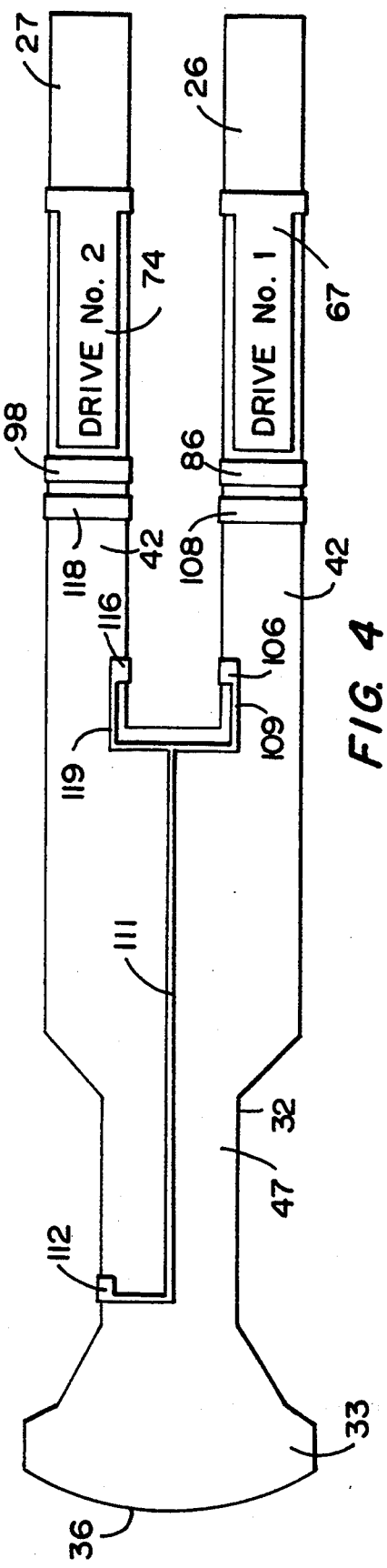

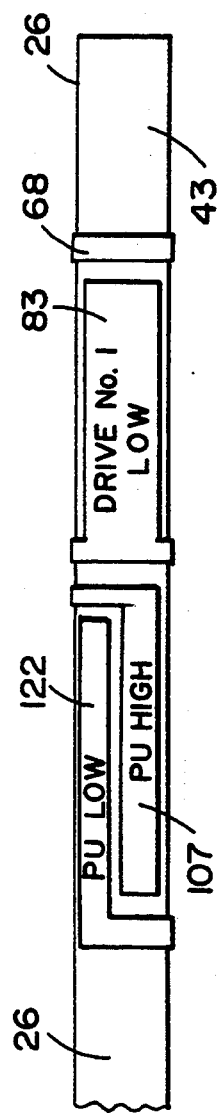
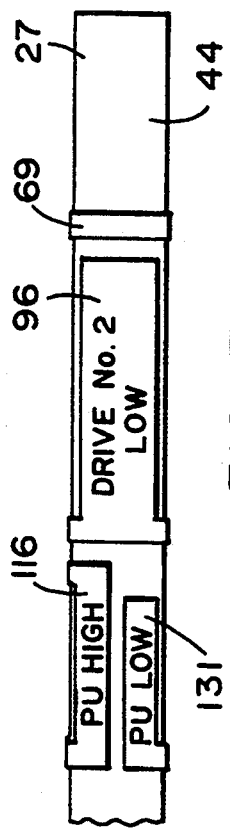
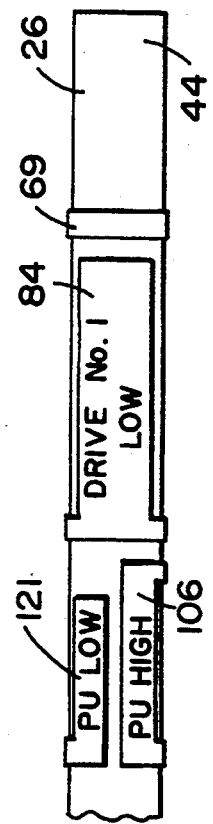
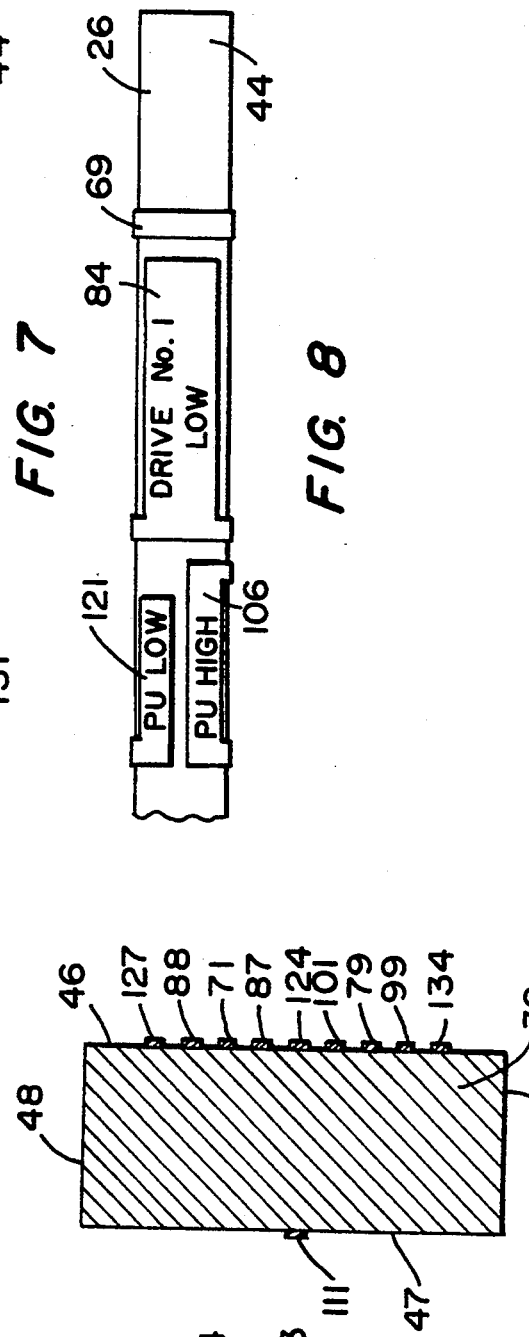
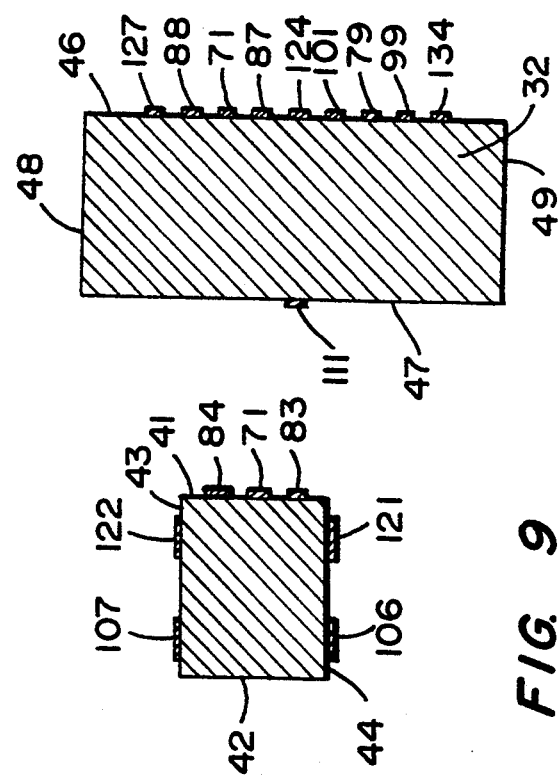

SINGLE ENDED TUNING FORK INTERNAL SENSOR AND METHOD

This is a division of application Ser. No. 07/667,828, filed Mar. 12, 1991, abandoned.

This invention relates to a single ended tuning fork inertial sensor and method.

Single ended and double ended tuning forks have heretofore been disclosed. However, such tuning forks have been found to be incapable of surviving very high launch shock environments such as encountered in artillery shells and the like. There is therefore a need for an inertial sensor and method which can function in very high G environments.

In general, it is an object of the present invention to provide a single ended tuning fork inertial sensor and method which can survive and/or operate in very high G environments.

Another object of the invention is to provide sensor and method of the above character which can withstand very high G forces in all directions.

Another object of the invention is to provide a sensor and method of the character in which first order cancellation of electronic coupling is accomplished.

Another object of the invention is to provide a sensor and method of the above character in which physical symmetry in the electrode pattern is provided to permit electrical cancellation of the portions of the pickup signals which are due to the drive signals.

Another object of the invention is to provide a sensor and method of the above character in which the pickup electrode pattern is designed to maximize pickup of the pickup signal and to balance out any portion of the signal in the pickup which is due to the drive.

Another object of the invention is to provide sensor and method of the above character in which laser trimming of the physical electrode pattern is used to achieve electrical balance.

Another object of the invention is to provide sensor and method of the above character in which the tines of the single ended tuning fork are rectangular in cross section and have a thickness which is substantially different from the width of the tines so that a different frequency of resonant response is utilized for the pickup than is used for the drive.

Another object of the invention is to provide a sensor and method in which the thickness is substantially greater than the width of the tine.

Another object of the invention is to provide a sensor and method in which the pickup frequency is substantially higher than the drive frequency.

Another object of the invention is to provide a sensor and method of the above character in which the drive and pickup electrodes are positioned to enhance the signal-to-noise ratio.

Another object of the invention is to provide a sensor and method of the above character in which strain effects of the drive motion on the pickup signals can be minimized.

Another object of the invention is to provide a sensor of the above character which can be readily and economically manufactured in large quantities.

Additional objects and features of the invention will appear in the following description in which the preferred embodiment is set forth in detail in the accompanying drawings.

FIG. 1 is partially exploded view of a single ended tuning fork inertial sensor assembly incorporating the present invention;

FIG. 2 is a block diagram of the electronics utilized in the sensor assembly shown in FIG. 1 and showing the manner in which the electronics is connected to the single ended tuning fork;

FIG. 3 is an enlarged top plan view of the single ended fork utilized in the sensor assembly shown in FIG. 1;

FIG. 4 is a bottom plan view of the single ended tuning fork shown in FIG. 3;

FIG. 5 is a side elevational view of the single ended tuning fork shown in FIG. 3 taken along the line 5—5 of FIG. 3;

FIG. 6 is a side elevational view of the single ended tuning fork shown in FIG. 3 taken along the line 6—6 of FIG. 3;

FIG. 7 is a side elevational view of the single ended tuning fork shown in FIG. 3 taken along the line 7—7 of FIG. 3;

FIG. 8 is a side elevational view of the single ended tuning fork shown in FIG. 3 taken along the line 8—8 of FIG. 3;

FIG. 9 is a cross sectional view taken along the line 9—9 of FIG. 3;

FIG. 10 is a cross sectional view taken along the line 10—10 of FIG. 3.

In general, the single ended tuning fork inertial sensor of the present invention is mounted with its associated electronics in a housing. The single ended tuning fork has first and second tines lying in a plane and having an axis of symmetry. A body is formed integral with the first and second tines and lies in the plane of the first and second tines. Means is provided for securing the body to the housing so that the housing serves as a base. The first and second tines have a rectangular cross section and have a width which is different from that of the thickness of the tines. Drive and pickup electrodes are mounted on the tines of the fork and are trimmed so that they are physically balanced to facilitate separation of the pickup signals from the drive signals.

More particularly as shown in the drawings, the single ended tuning fork inertial sensor assembly 11 consists of a cylindrical housing 12 which is provided with a lower cylindrical part 13 which houses the electronics shown in block diagram form in FIG. 2 and an upper cylindrical part 14 which houses a single ended tuning fork 16. The housing 12 also consists of a circular cover 17. The parts 13, 14 and 17 of the housing 12 can be formed of a suitable material such as aluminum and are sealed into a unitary hermetically sealed assembly by solder or laser welding.

The upper part 14 of the housing 12 is provided with a cylindrical recess 21 which accommodates the single ended tuning fork 16. Means provided in the housing serves as a platform or base 22 on which the tuning fork 16 is mounted or supported. The tuning fork 16 is formed of a single piece of piezoelectric material as for example, Z-cut quartz or lithium niobate or other types of crystal and quartz-like materials. The piezoelectric material can have a thickness which is chosen for the characteristics desired in the single ended tuning fork 16 to be fabricated therefrom. By way of example, the thickness can range from 80 to 25 mils and typically can be 40 mils. The single ended tuning fork 16 can be fabricated from the piezoelectric material by suitable means such as chemical etching by techniques well known to those skilled in the art.

The single ended tuning fork 16 after fabrication from the single piece of crystal consists of first and second spaced apart parallel tines 26 and 27 which lie in a plane and have an axis of symmetry. The first and second tines 26 and 27 are formed integral with a body 28 which typically lies on the axial symmetry and lies in the same plane as the tines 26 and 27. A space 29 is provided between the tines 26 and 27 and terminates in a crotch 31 in the region where the body 28 adjoins the two tines 26 and 27. The body 28 is provided with a narrowed portion which can be identified as a stem 32 and an enlarged portion remote from the tines 26 and 27 which can be identified as a pedestal 33.

As can be seen particularly from FIGS. 3 and 4, the pedestal 33 is of increasing width and is provided with tapers 34. The pedestal 33 on the side opposite tines is provided with a curved surface 36 which conforms to the curvature of the cylindrical recess 21. The single ended tuning fork 16 is mounted within the upper part 14 of the housing 12 in a suitable manner such as by use of an adhesive disposed between the pedestal 33 and the platform or base 22 and the curved surface 36 of the pedestal 33 and the housing wall defining the cylindrical recess 21. In addition, a pair of pins 37 disposed on opposite sides of the pedestal 33 engage the tapers 34 which serve as shoulders for retaining the pedestal and portions of the tuning fork 16 in firm engagement with the platform or base 22 so the tuning fork and the sensor assembly 11 can accommodate very high G forces. The tapers 34 make it possible to achieve a flared pedestal 33 without providing sharp inside corners which would have a tendency to create stress risers under shock loading.

The tines 26 and 27 of the single ended tuning fork 16 are rectangular in cross section as shown in FIG. 9 and have two dimensions, the width and the thickness, which are different from each other. Typically, the tines have a width less than their thickness as shown in FIG. 9. In one embodiment of the present invention, the first and second tines 26 and 27 have a length of approximately twice that of the stem 32. The width of space 29 between the tines 26 and 27 is approximately twice the width of the tines. The stem 32 has a length which is greater than its width.

Each of the first and second tines 26 and 27 is provided with top and bottom planar surfaces 41 and 42 and first and second side planar surfaces 43 and 44 (see FIG. 9). The stem 32 is provided with top and bottom planar surfaces 46 and 47 and first and second side surfaces 48 and 49 (see FIG. 10).

Drive electrodes 61 and pickup electrodes 62 are mounted on the single ended tuning fork 16. In one embodiment of the invention, it has been found desirable to place the pickup electrodes 62 closer to the crotch 31 than the drive electrodes 61 principally because it is easier to achieve greater power for the drive electrodes, and for the electronics to compensate for the greater distance from the crotch 31, than it is to increase or amplify the pickup voltages picked up by the pickup electrodes. It is desirable to place the pickup electrodes near the crotch 31 where the most stress is created to thereby make it possible to maximize the pickup signal and thereby enhance the signal-to-noise ratio.

The drive electrodes 61 for the tine 26 consist of electrodes 66 and 67 which are formed on the top and bottom surfaces 41 and 42 and form drive electrode No. 1 and are joined together by leads 68 and 69 provided on the sides 43 and 44. The drive electrodes 66 and 67 are connected to a lead 71 on the surface 41 which extends on the surface 46 of the stem 32 to a pad 72 which is provided on a pedestal 32.

In a similar manner, electrodes 73 and 74 are provided on the surfaces 41 and 42 of the other tine 27 to form drive electrode No. 2 which are joined together by leads 76 and 77 provided on the sides 43 and 44 of the tine 27 to form the drive electrode No. 2. The electrodes 73 and 74 are connected to a lead 79 on the surface 41 and extends over the top surface 46 of the stem 32 to a pad 81.

Drive No. 1 low or ground electrodes 83 and 84 are provided on the sides 43 and 44 of the tine 26 and are interconnected on the bottom side 42 by lead 86 on the surface 42 and are connected on the top side 41 by leads 87 and 88 which are both connected to a pad 91 on the pedestal 33. In a similar manner, drive No. 2 low or ground electrodes 96 and 97 are provided on the sides 43 and 44 on the tine 27 and are interconnected on the bottom side 42 by a lead 98 and are connected on the top side 41 by two leads 99 and 101 which are both connected to a pad 102 on the pedestal 33.

The pickup electrodes 62 for the tine 26 consist of pickup high electrodes 106 and 107 provided on the sides 43 and 44 of tine 26 and are interconnected on the bottom side 42 by lead 118 on bottom side of the surface 42 and then are connected by a lead 109 (see FIG. 4) to a lead 111 extending over on the bottom surface 47 of the stem 32. The lead 111 is connected to a lead 112 on the side 49 (see FIG. 5). The lead 112 is connected to a lead 113 which is connected to a pad 114 on the pedestal 33. In a similar manner, pickup high electrodes 116 and 117 are provided on the side surfaces 43 and 44 of the tine 27 and are interconnected by a lead 118 on the bottom side 42 and are connected by a lead 119 to lead 111 which is connected by lead 113 to the pad 114.

Pickup low electrodes 121 and 122 are provided on the side surfaces 43 and 44 of tine 26. Electrode 121 is connected by a lead 123 to another lead 124 which extends centrally down the stem 32 of the surface 46 to pad 126 on the pedestal 33. Electrode 122 is connected by a lead 127 to the pad 126. In a similar manner, pickup low electrodes 131 and 132 are provided on the surfaces 43 and 44 of the tine 27. Electrode 131 connected by a lead 133 to the lead 124 to the pad 126. Electrode 132 is connected by a lead 134 to the pad 126. The pads heretofore described can be formed of gold and are bonded to gold leads (not shown) which are fed through the platform or base 22 and extend into the lower part 13 of the housing where they are connected to the electronic circuitry shown in block diagram form in FIG. 2. The gold leads are insulated from each other and are hermetically sealed in parts 13 and 14 of the housing 12. It is desired that the feedthroughs utilized be disposed in a symmetric pattern with respect to the fork and also to minimize coupling between feedthroughs. Because of the size of the pedestal 33, the feedthroughs can be physically separated by a substantial distance so that there is relatively low capacitive coupling between them.

In order to minimize the capacitive coupling between the leads, the electrodes heretofore described are disposed to achieve as closely as possible physical symmetry or balance. The drive high leads 71 and 79 are well guarded or shielded with respect to ground. The leads provided on the opposite sides of the drive high leads 71 and 79 serve to provide grounds so that any electrostatic field flux lines which are created are shorted to ground. The leads 71 and 79 are also highly guarded with respect to the pickup high leads 124 and 111 which are provided on opposite sides or on the top and bottom of the body 28 of the fork 16 (see FIG. 10). The pickup high lead 109 is disposed in the middle of the stem 32 and thus is symmetrically coupled to the dielectric provided by the quartz of the fork 16 and also symmetrically coupled with respect to the drive high signals provided on the drive high leads 71 and 79. In this way, the pickup high lead 111 is coupled equally through the dielectric of the fork 16. Since the drive high leads 71 and 79 are driven in opposite phases as hereinafter described, the signals picked up by the pickup high lead 111 will be equal and opposite and therefore be nulled out and be substantially equal to zero. This minimization of pickup is also aided by the fact that the spacing between the pickup high lead 111 and the drive high leads 71 and 79 is relatively large and therefore the capacitance very low.

In connection with the foregoing described electrodes and leads and the metalization which provided the same, it can be seen that metalization is provided on the top and bottom surfaces 41 and 42 as well as the side surfaces 43 and 44 of the tines 26 and 27. The lead patterns are such as shown that the leads wrap around the tines and serve as guards between the pickup high leads and the drive high leads which are disposed next to each other but on the top and bottom sides of the fork. This arrangement makes it possible to provide adequate guarding or shielding while still providing the desired symmetry for the leads and electrode patterns.

It should be appreciated, however, that different patterns can be utilized, for example, by using appropriate guarding, all the leads could be provided on the top side. Alternatively, some of the leads could be provided on the sides of the fork. However, because of the small geometry and the desire for precision in the positioning and sizing of the leads, it has been found desirable to have most of the lead pattern on the top surface of the fork where the dimensioning of the leads and the spacing between the leads may be more precisely controlled. Such a patterning of the leads and electrodes can be readily achieved by utilizing two-sided mask sets with masks on opposite sides that can be precisely registered. The side metalization for the sides of the fork can also be provided by use of the aperture shadow masks after the top and bottom surface metalization has been accomplished by utilizing conventional masking and photo resist techniques.

Operation and use of the single ended tuning fork heretofore described in conjunction with the electronics in FIG. 2 can now briefly be described as follows. The drive low lines 142 and 143 are connected to the drive oscillator 151 which is comprised of a current amplifier 152 which is provided with resistive feedback through a resistor 153 connected between the output of the amplifier and the drive low line 142. The drive low line 143 is connected to the ground as shown. The output amplifier 152 is also supplied by a line 156 to provide a reference to a synchronous demodulator 157. The line 156 is also connected to a 90° phase shifter 158 to supply the same reference signal but shifted by 90° to another phase sensitive demodulator 159.

The output of the drive oscillator 151 is also supplied to an amplifier 161 which is provided with automatic gain control by automatic gain control circuitry 162 that has input connected to the output of the drive oscillator 151 and an output connected to the amplifier 161. The automatic gain control circuitry is connected to a voltage reference 163. The output from the amplifier 161 is supplied by a line 166 directly to the drive lead 79 and through an inverter 167 to the drive lead 71 so that the tines 26 and 27 are driven into oscillation by a hi-phase drive with appropriate 180° phasing. In the arrangement shown, the tine 27 is driven in a closed loop fashion whereas the other tine 26 is driven by the inverter 167 and immediately follows the tine 27. It is for this reason that the low side of the follower tine 26 is at hard ground whereas the low side of the active tine 27 provides the input to the drive oscillator 151.

The AGC circuit 162 is of a conventional type and consists of a detector and amplifier which serves an AC/DC converter that looks at the output from the current amplifier 152 and rectifies the AC to DC and then makes a comparison with the reference DC voltage provided by the AGC reference 163. The loop amplifier in the AGC circuitry 162 controls the gain of the amplifier 161 in such a way that the gain around the oscillator loop is unity to thereby achieve continuous oscillation at fixed amplitude. In this manner, the output of the current amplifier 152 is regulated to a precise value, the precision depending upon the accuracy of the voltage reference 163 that is being utilized. By regulating the current of the current amplifier 152, it is possible to regulate the vibrational velocities of the tines 26 and 27 to be constant. The piezoelectric material which is utilized for the fork 16 has a piezoelectric coefficient which relates flexure or deflection of the tine to charge. The drive current being regulated is the derivative of the charge, making it possible to regulate the derivative of the flexure of the tine which is its velocity. By precisely regulating the velocity of the drive tine in this manner, it is possible to precisely regulate one major factor in determining the magnitude of the rate signal in the sensor.

From the foregoing, it can be seen that a bi-phase drive is provided for the fork 16 and at least one drive is simply equal to the other except that one drive can be considered to be a $+1$ whereas the other drive can be considered to be a $-1$ because it is 180° out of phase with the other. It should be appreciated that it is possible within the scope of the present invention to provide bi-phase drives which are not exactly of equal magnitude and 180° out of phase with each other. For example, rather than a $-1$, the magnitude could be varied from $-0.9$ to $-1.1$ in order to provide an electrical trim to compensate for asymmetry of the electrical feedthrough capacitances to the pickup. By utilizing a bi-phase drive, the tines 26 and 27 move in opposite directions towards and away from each other in the plane in which the tines 26 and 27 lie. The drive electrodes are positioned on the tines 26 and 27 so that the low side electrodes of both tine drives are all on the sides of the tines and the actual active high voltage drive electrodes are on the top and bottom surfaces of the tines 26 and 27. In order to achieve movement of the tines in opposite directions, the phase of these drive signals must be substantially 180° out of phase or opposite as heretofore described.

The pickup high and the pickup low signals are provided on lines 168 and 169 respectively to a charge amplifier 171 which is provided with capacitive feedback through a capacitor 172. The pickup low line 169 is connected to ground as shown. The output from the charge amplifier 171 is supplied to a filter/amplifier 176 which has its output 177 connected to the synchronous demodulators 157 and 159. The output of the synchronous demodulator 157 is supplied to a filter/amplifier 181 which provides on its output 182 a signal which is identified as $E_o$ which is the DC rate signal proportioned to the input angular rate being sensed. As heretofore described the pickup electrodes on the fork 16 are brought out as pickup low and pickup high leads. The pickup low lead 169 is the ground lead whereas the pickup high lead 168 supplies its summed information to the charge amplifier 171 after which it is demodulated by the synchronous demodulator 157 and filtered to provide the output rate signal. The synchronous demodulator 157 demodulates the signal supplied to it by the filter amplifier 176 against a 90° quadrature reference from phase shifter 158 into a quadrature output $E_q$ supplied from a filter/amplifier 183 connected to the phase sensitive demodulator 159. The quadrature output Eq is useful for testing and balancing purposes because most error sources are in quadrature phase to the drive current.

In connection with the foregoing, it should be appreciated that drive strain contamination of the pickup strains occurs because the pickup strains occur in the same body of quartz which serves as the tuning fork 16 as do the drive strains. By way of example the drive tines may flex in an environment which creates 5000 G's at the tips of the tines 26 and 27 at nominal deflections and at a nominal frequency. This flexing of the tines creates large strains in the fork and in the crotch region 31. The tip velocities of the tines 26 and 27 create Coriolis accelerations when the fork 16 is rotated at some nominal full scale as for example 100° per second about its axis of symmetry. The Coriolis acceleration acts in a direction perpendicular to the direction of oscillation of the tines and therefore places a strain in a perpendicular direction in the crotch 31 of the tines with a magnitude at least four decades less than the drive strain, at full scale input rate. By way of example, typically it is desirable to accurately perceive a pickup signal which is approximately one million times smaller than the drive strain which is occurring in the same region of the quartz fork 16. Thus, at the pickup electrodes, charges due to drive strains are present.

If the pickup electrodes were perfect in physical symmetry, the drive strains would all subtract from each other such as to cancel out. However, since the pickup electrodes cannot be made perfectly physically symmetrical, there will be some residual charges on the pickup electrodes which represent the drive strains. These pickup signals are related to the drive strains which are in phase with drive acceleration. Since the Coriolis acceleration is in phase with the drive velocity, the drive strain is picked up by the pickup electrodes are in quadrature with the desired rate signal. This is in contrast to electric coupling capacitances which are in phase with the rate signal. Thus, the signal picked up by the pickup electrodes from the drive strains is in quadrature. This signal must be balanced out if at all possible because the magnitude of the drive strains relative to the pickup strains, may be for example, from 1,000,000:1 to 100,000:1 which can cause dynamic range handling difficulties in the signal processing electronics.

In order to minimize the pickup of the drive strains by the pickup electrodes, the electrode patterns are laser trimmed to solve the quadrature problem with respect to drive strains being picked up by the pickup electrodes. It has been found that by use of such laser trimming of the electrodes, it is possible to reduce to zero a quadrature offset of tens of thousands of degrees per second. By utilizing the trimming, it is possible to minimize the requirement for quadrature balancing or zeroing in the electronics. If large quadrature offsets had to be accommodated by the electronics, electronics would be required to accommodate a very large dynamic range of signals while maintaining extreme phase accuracy. In other words, in the present invention, it is far preferable to mechanically trim the electrodes to provide a more precise electrical null of quadrature output rather than trying to balance the same with the external electronic circuitry which has the additional difficulty in that the errors due to imbalances of electrodes and electrical outputs do not track well with temperature. Thus, in the present invention, it has been found preferable to balance out mechanical errors of electrode balance for example, by laser trimming the electrode patterns.

In accordance with the present invention, it is also desirable to select a predetermined "delta f" which is the frequency difference between the frequency of the pickup resonant mode and the frequency of the drive resonant mode. Because the quartz utilized for the single crystal fork is of a very high Q material, the pickup signal appears in a high gain resonant system with a narrow bandwidth. Damping to increase the bandwidth is impractical in the present application because of the inherent low piezoelectric coupling of the quartz. For these reasons, it has been elected in the present invention to operate the tuning fork 16 with a pickup resonance or mode which is different from i.e.; above or below the drive frequency or mode. In the present invention it has been found more desirable to chose a pickup mode which is above that of the drive mode. This is accomplished by providing a tine which is not square in cross section. In the first order, the frequency of the resonating tine is a constant times the width over the length of the tine squared. By width is meant the width in the direction that the tine is flexing in the drive mode; in the pickup mode, it is the width in a direction perpendicular thereto, in other words, the thickness of the quartz material utilized for the fork. Thus, with tines which are square and which the thickness and width are the same, the drive and pickup resonant frequencies would be identical to at least the first order. So, with the present invention, typically it is desired to separate the pickup frequency from the drive frequency by approximately 3%. Thus, for example a 10 kHz drive frequency would suggest a 10.3 kHz frequency for the pickup. Since it is difficult to achieve such precision in the fabrication of the quartz fork 16, the width has been selected to be from 50-80% of the thickness. This provides a frequency difference ranging from 2-5 kHz rather than the desired 300 Hz. In order to achieve a smaller difference as for example the 3% off drive frequency, the stem 32 of the fork is made narrower than the body 28. This provides additional torsional flexibility in the stem 32 so that the pickup mode not only includes the tines flexing out of the plane of vibration but also includes the entire body 28 and stem 32 rotating in a torsional manner. Depending upon the cross section of the tine, the length and width of the stem are chosen so that the composite pickup mode is 3% away from the drive mode.

By selecting a delta f in this manner, it is possible to provide a single ended tuning fork inertial sensor and a method which is particularly adapted for operating in very high G launch environments. In connection with the present invention, it has been found possible to meet these requirements without unduly sacrificing performance. It has been possible to accommodate high Gs in all directions and for example forces as great at 21,000 Gs. The sensor of the present invention also permits a relatively large format for the tuning fork. By mounting the stem directly to the case, it is possible to provide a hard mount for the fork. Since the mounting for the fork is substantially a single point and on the torsional center line, there is a minimum DC strain intrusion. The only two significant parasitic modes which exist are X and Z direction stem bending at 3-5 kilohertz which are decoupled from the drive and pickup signals. The sensor has great ruggedness in the roll axis (Y) and in addition has high G capabilities in the X and Y axes. The construction of the sensor is relatively simple making it feasible to manufacture the same economically in high quantities.

In the event that it is desired to utilize the sensor for sensing acceleration, the tip extremities of the tines can be notched as disclosed in U.S. Pat. No. 4,930,351.

From the foregoing, it can be seen that the single ended tuning fork of the present invention can be used as a Coriolis rate sensor where the tuning fork is utilized to convert an angular rate input into a mechanical signal which can be sensed and converted to a rate output signal of the type described in U.S. Pat. Nos. 4,524,619, 4,538,461 and 4,654,663.

What is claimed is:

1. In a method for sensing rate by the use of a single ended tuning fork mounted in a housing and having first and second tines lying in a plane and having an axis of symmetry and a body formed integral with the first and second tines and having drive electrodes and pickup electrodes mounted on the tines, the method comprising supplying an oscillator frequency to the drive electrodes to drive them in a drive mode and sensing an angular rate signal provided by the pickup electrodes in response to rotation about said axis of symmetry, the improvement comprising forming each of the first and second tines so that they are rectangular in cross section and having a width which is different from the thickness to separate by a delta f frequency the pickup mode from the drive mode and forming a stem in the body which has width and length that causes reduction in the delta f frequency.

2. A method as in Claim 1 wherein delta f is greater than 0.1%.

3. A method as in Claim 1 wherein delta f is approximately 3%.

* * * * *

UNITED STATES PATENT AND TRADEMARK OFFICE
CERTIFICATE OF CORRECTION

PATENT NO. : 5,408,876

DATED : April 25, 1995

INVENTOR(S) : David F. Macy

It is certified that error appears in the above-indentified patent and that said Letters Patent is hereby corrected as shown below:

IN THE TITLE: at [54], also column 1, line 2, delete "INTERNAL" and insert therefor —INERTIAL—.

Signed and Sealed this

Twenty-ninth Day of August, 1995

Attest:

BRUCE LEHMAN

Attesting Officer     Commissioner of Patents and Trademarks

US005408876B1

REEXAMINATION CERTIFICATE (4103rd)

United States Patent [19]
Macy

[11] B1 5,408,876
[45] Certificate Issued *Jun. 20, 2000

[54] SINGLE ENDED TUNING FORK INERTIAL SENSOR AND METHOD

[75] Inventor: David F. Macy, Mission Viejo, Calif.

[73] Assignee: New SD, Inc., San Francisco, Calif.

Reexamination Request:
No. 90/004,819, Oct. 28, 1997

Reexamination Certificate for:
Patent No.: 5,408,876
Issued: Apr. 25, 1995
Appl. No.: 08/152,822
Filed: Nov. 15, 1993

[ * ] Notice: This patent is subject to a terminal disclaimer.

Certificate of Correction issued Aug. 29, 1995.

[51] Int. Cl.⁷ ...................................................... G01P 9/04
[52] U.S. Cl. ........................................ 73/504.16; 310/370
[58] Field of Search ............................ 73/504.12, 504.15, 73/504.16, 1.37; 310/329, 370

[56] References Cited

U.S. PATENT DOCUMENTS

| | | |
|---|---|---|
| 4,628,734 | 12/1986 | Watson . |
| 4,671,112 | 6/1987 | Kimura et al. . |
| 4,674,331 | 6/1987 | Watson . |
| 5,343,749 | 9/1994 | Macy ................................... 73/504.16 |

FOREIGN PATENT DOCUMENTS

| | | |
|---|---|---|
| 140016 | 6/1987 | Japan . |
| 188975 | 8/1987 | Japan . |
| 3-19911 | 2/1991 | Japan . |

OTHER PUBLICATIONS

J. Söderkvist; Design of a Solid–State Gyroscopic Sensor Made of Quartz, *Sensors and Actuators*, A21–A23 (1990) 293–196, Feb. 1990.

*Primary Examiner*—John E. Chapman

[57] ABSTRACT

Single ended tuning fork inertial sensor having a housing and a single ended tuning fork of a quartz-like material of a predetermined thickness, the tuning fork has first and second tines lying in a plane and having an axis of symmetry and has a body formed integral with said first and second tines. The body is rigidly secured to the housing. The tines have a rectangular cross section and have a width which is different from the thickness. The body has a stem formed therein which has a width less than that of the body. Drive electrodes are secured to the tines. An oscillatory frequency is supplied to the above drive electrodes to excite the tines in a drive mode and in the presence of an axial angular rate to cause the tines to operate in a pickup mode which is substantially separated in frequency from the drive mode. The width and thickness of the tines are chosen so as to provide a frequency difference between the frequency of the pickup mode and the frequency of the drive mode, and width and length of the stem are chosen so as to a reduce the frequency difference.

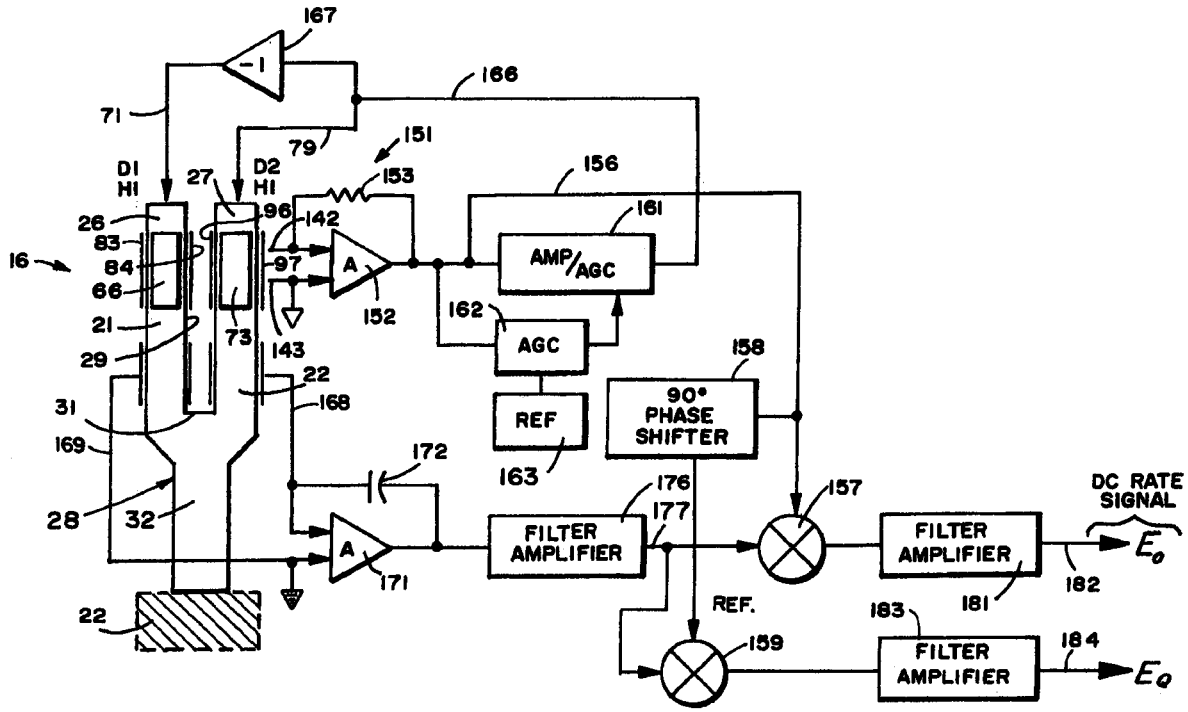

ative.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–3 is confirmed.

New claims 4–9 are added and determined to be patentable.

*4. In a method of sensing rate of rotation, the steps of: forming a single ended tuning fork as an integral structure of piezoelectric material having a body and a pair of tines which lie in a plane and ae disposed symmetrically about an axis, forming the tines with a rectangular cross section having a width upon which the frequency of a drive mode is dependent and a thickness upon which the frequency of a pickup mode is dependent, the width of the tines being different than the thickness so that the frequency of the drive mode is separated from the frequency of the pickup mode, forming the body to include a stem which is narrower in width than the body and is dimensioned to have a torsional flexibility such that the pickup mode includes torsional rotation of the stem as well as flexing the tines whereby the frequency separation between the pickup mode and the drive mode is reduced, mounting drive electrodes and pickup electrodes on the tines, mounting the tuning fork in a housing, applying an oscillator frequency to the drive electrodes to drive them in the drive mode, and sensing an angular rate signal provided by the pickup electrodes in accordance with vibration of the tines in the pickup mode in response to rotation about the axis of symmetry.*

*5. The method of claim 4 wherein the tines are formed so that the thickness of the tines is greater than the width and the pickup mode frequency is higher than the drive mode frequency.*

*6. The method of claim 4 wherein the tines are formed so that the width is on the order of 50 to 80 percent of the thickness.*

*7. The method of claim 4 wherein the tines are formed and the stem is dimensioned to make the difference in frequency between the drive mode and the pickup mode on the order of 3 percent of the drive mode frequency.*

*8. The method of claim 1 wherein the stem is formed with a width and length which give the stem a torsional flexibility, and the pickup mode includes both flexing of the tines and torsional rotation of the stem.*

*9. The method of claim 1 wherein the frequency of the pickup mode is higher than the frequency of the drive mode, and the stem is formed with a width and length which give the stem a torsional flexibility that lowers the frequency of the pickup mode.*

\* \* \* \* \*